(12) United States Patent
Wolf et al.

(10) Patent No.: US 12,420,368 B2
(45) Date of Patent: Sep. 23, 2025

(54) METHOD AND DEVICE FOR REMOVING A WORKPIECE PART FROM THE REMAINDER OF THE WORKPIECE

(71) Applicant: TRUMPF WERKZEUGMASCHINE SE + CO. KG, Ditzingen (DE)

(72) Inventors: Dennis Wolf, Rutesheim (DE); Michael Elser, Stuttgart (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 1240 days.

(21) Appl. No.: 17/190,684

(22) Filed: Mar. 3, 2021

(65) Prior Publication Data

US 2021/0178540 A1    Jun. 17, 2021

Related U.S. Application Data

(63) Continuation of application No. PCT/EP2019/071285, filed on Aug. 8, 2019.

(30) Foreign Application Priority Data

Sep. 17, 2018  (DE) .......................... 102018215738.3

(51) Int. Cl.
  *B23Q 5/22*     (2006.01)
  *B23K 26/38*    (2014.01)
(52) U.S. Cl.
  CPC ................ *B23Q 5/22* (2013.01); *B23K 26/38* (2013.01)
(58) Field of Classification Search
  CPC .................................. B23Q 5/22; B23K 26/38
  See application file for complete search history.

(56) References Cited

U.S. PATENT DOCUMENTS

| 5,092,829 A | * | 3/1992 | Gerber | B26D 7/1836 |
| | | | | 227/67 |
| 5,101,747 A | * | 4/1992 | Gerber | B26D 7/1818 |
| | | | | 112/470.36 |
| 5,889,675 A | * | 3/1999 | Minami | B25J 9/1612 |
| | | | | 83/61 |

(Continued)

FOREIGN PATENT DOCUMENTS

| CN | 102029318 A | 4/2011 |
| CN | 105538519 A | 5/2016 |

(Continued)

*Primary Examiner* — Adam J Eiseman
*Assistant Examiner* — Richard D Crosby, Jr.
(74) *Attorney, Agent, or Firm* — Laurence A. Greenberg; Werner H. Stemer; Ralph E. Locher

(57) ABSTRACT

A method for removing a workpiece from the remainder of the workpiece supported in a bearing plane. The method includes moving the workpiece part, which is clamped between at least one ejector element of an ejection unit and at least one counter-holding element of a counter-holding unit, along a removal direction, and checking whether the workpiece part has been completely separated from the remainder of the workpiece during movement along the removal direction. The method is characterized by reducing or completely canceling the clamping of the workpiece part and subsequently resuming the clamping of the workpiece part if it is determined during checking that the workpiece part has not been completely separated from the remainder of the workpiece.

13 Claims, 6 Drawing Sheets

(56) References Cited

U.S. PATENT DOCUMENTS

| | | | |
|---|---|---|---|
| 6,827,544 B2 | 12/2004 | Nagasawa | |
| 7,131,361 B2* | 11/2006 | Nakajima | B23Q 7/10 83/279 |
| 9,156,179 B2 | 10/2015 | Bauch et al. | |
| 9,440,281 B2 | 9/2016 | Hirata | |
| 9,452,544 B2* | 9/2016 | Hagenlocher | B23K 26/702 |
| 10,220,475 B2 | 3/2019 | Schmauder et al. | |
| 10,449,592 B2 | 10/2019 | Mathias et al. | |
| 10,512,965 B2 | 12/2019 | Prokop et al. | |
| 11,167,387 B2 | 11/2021 | Epperlein et al. | |
| 11,229,980 B2 | 1/2022 | Deiss et al. | |
| 2004/0202531 A1* | 10/2004 | Beransky | B23K 37/0408 414/751.1 |
| 2015/0306653 A1* | 10/2015 | Mathias | B21D 28/10 700/219 |
| 2017/0066033 A1* | 3/2017 | Prokop | B23K 26/38 |
| 2018/0085864 A1* | 3/2018 | Wilhelm | B21D 43/02 |
| 2019/0091799 A1 | 3/2019 | Deiss et al. | |
| 2020/0016647 A1 | 1/2020 | Deiss | |

FOREIGN PATENT DOCUMENTS

| | | |
|---|---|---|
| CN | 105829008 A | 8/2016 |
| CN | 106042065 A | 10/2016 |
| DE | 102012207818 A1 | 11/2013 |
| DE | 102013226816 A1 | 6/2015 |
| DE | 102014209811 B4 | 7/2016 |
| DE | 102016208872 A1 | 11/2017 |
| DE | 102016209550 A1 | 12/2017 |
| DE | 102017205095 B3 | 6/2018 |
| JP | H0724795 A | 1/1995 |
| JP | H07171643 A | 7/1995 |
| JP | H082670 A | 1/1996 |
| JP | H10080738 A | 3/1998 |
| JP | 2006122931 A | 5/2006 |
| JP | 20061122931 A | 5/2006 |
| JP | 2015199078 A | 11/2015 |
| WO | 2014023323 A1 | 2/2014 |

* cited by examiner

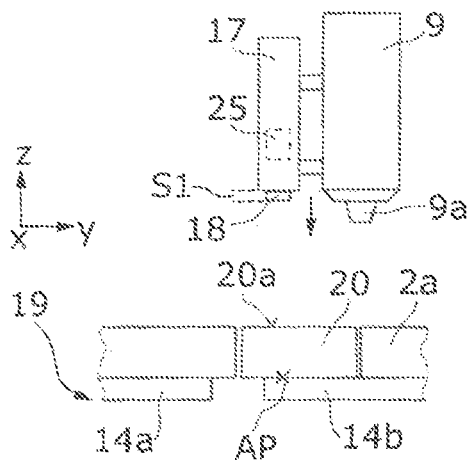 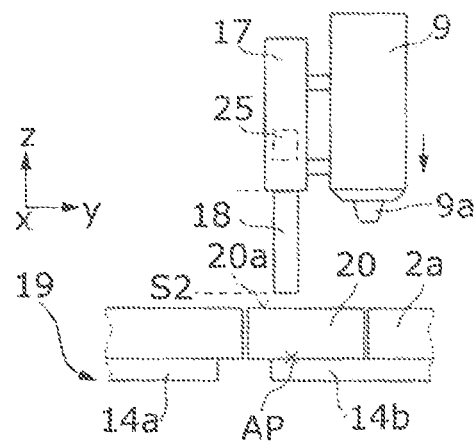
Fig. 2A        Fig. 2B
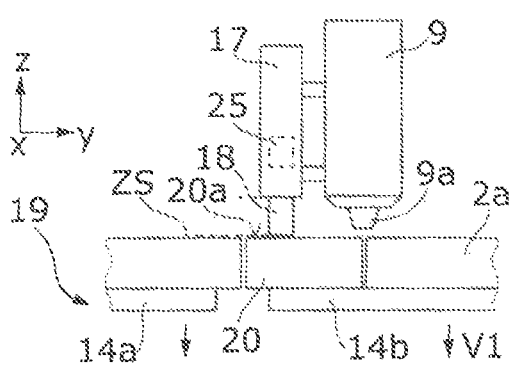 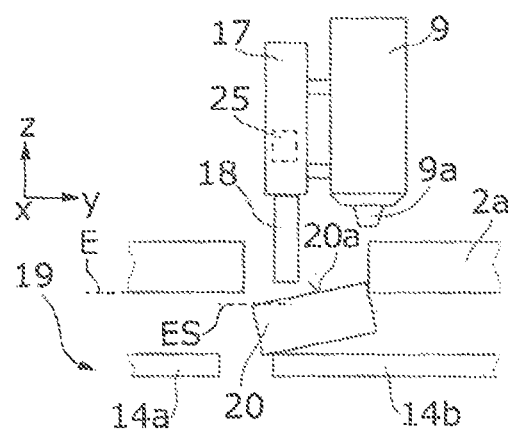
Fig. 2C        Fig. 2D

METHOD AND DEVICE FOR REMOVING A WORKPIECE PART FROM THE REMAINDER OF THE WORKPIECE

CROSS-REFERENCE TO RELATED APPLICATION

This application is a continuation, under 35 U.S.C. § 120, of copending international application No. PCT/EP2019/071285, filed Aug. 8, 2019, which designated the United States; this application also claims the priority, under 35 U.S.C. § 119, of German patent application No. DE 10 2018 215 738.3, filed Sep. 17, 2018; the prior applications are herewith incorporated by reference in their entirety.

BACKGROUND OF THE INVENTION

Field of the Invention

The present invention relates to a method for removing a workpiece part from the remainder of the workpiece supported in a bearing plane, containing moving the workpiece part, which is clamped between at least one ejector element of an ejection unit and at least one counter-holding element of a counter-holding unit, along a removal direction, and checking whether the workpiece part has been completely separated from the remainder of the workpiece during movement along the removal direction. The invention also relates to a device for removing a workpiece part from the remainder of the workpiece supported in a bearing plane, containing: an ejection unit, which has at least one ejector element movable along a removal direction, a counter-holding unit, which has at least one counter-holding element movable along the removal direction, and a sensor unit for checking whether the workpiece part clamped between the at least one ejector element and the at least one counter-holding element has been completely separated from the remainder of the workpiece.

On automated laser cutting machines, workpiece parts cut free from the (remainder of the) workpiece, e.g. from a metal sheet, are removed from the surrounding remainder of the workpiece (scrap skeleton) with the aid of gripping, ejection and/or suction-gripping devices. For removal of parts in a reliable process, it is important to check whether the workpiece part has actually been separated from the scrap skeleton. If removal of the part has not been successful, strategies for repeated attempts at removal (repeat strategies or retry strategies) are necessary, especially if removal of the part takes place not after the complete processing of the entire workpiece but as an intermediate step during the separative machining of a plurality of workpiece parts. A laser cutting machine having integrated automation of this kind is described in German patent DE 10 2014 209 811 B4 (corresponding to U.S. Pat. No. 10,512,965) or in published, non-prosecuted German patent application DE 10 2016 208 872 A1 (corresponding to U.S. patent publication No. 2019/0091799), for example.

Various repeat strategies for the removal of parts are known from the prior art.

Japanese patent application JPH1080738A discloses, when removing workpiece parts downward via a flap for the parts that is arranged in the workpiece support, of repeating the opening and closure of the flap for the parts several times if there is a failure to detect that the workpiece part has fallen. A limit value is specified for the number of repetitions.

U.S. Pat. No. 6,827,544 B2 discloses, for the purpose of releasing workpiece parts from the scrap skeleton, of gripping the parts by means of a suction-gripping unit that has a plurality of suction grippers, wherein the landing position of the suction-gripping unit or of the suction grippers on the workpiece part is changed if there is an insufficient vacuum build up during the removal of the parts.

In international patent disclosure WO2014023323A1 (corresponding to U.S. Pat. No. 10,449,592) a description is given of a method for removing a workpiece part, formed by separative machining of a sheet-like workpiece resting on a workpiece support, from the remainder of the workpiece. The workpiece is fixed for machining by means of a holding unit and can be moved along at least one direction in an X-Y plane of the workpiece. For removal, the workpiece part is gripped by means of a (suction) gripper unit. If snagging of the workpiece part with the remainder of the workpiece is detected, at least one release strategy is initiated, in which at least one traversing movement of the holding unit, of the gripper unit or of the gripper unit and of the holding unit relative to one another in the X-Y plane is activated. Moreover, it is described that an additional traversing movement of the holding unit and/or of the gripper unit in the Z direction can be performed.

In the removal of workpiece parts from the scrap skeleton, during which the workpiece parts are simultaneously acted upon by an ejection unit and supported by a counter-holder ("sandwich removal"), there is the risk, when employing the release strategy described in international patent disclosure WO2014023323A1, that the forces acting on the workpiece part and the removal units, i.e. on the ejection unit and the counter-holding unit, will become too large, and therefore these may be damaged; for example, lifting elements in the form of lifting pins of the ejection unit may be bent with such a release strategy.

BRIEF SUMMARY OF THE INVENTION

It is the underlying object of the invention to provide a method and a device for removing workpiece parts by means of a repetition strategy adapted to sandwich removal.

According to the invention, this object is achieved by a method of the type stated at the outset, further containing: reducing or completely canceling the clamping of the workpiece part and subsequently resuming the clamping of the workpiece part if it is determined during checking that the workpiece part has not been completely separated from the remainder of the workpiece. In this context, "reducing the clamping" is interpreted to mean reducing the clamping force of the ejector element acting on the workpiece part and/or that of the counter-holding element in stages or continuously. The reduction or cancellation of the clamping can be accomplished by open-loop or closed-loop pressure control or by moving the at least one ejector element and/or the at least one counter-holding element along the removal direction. If the clamping is completely canceled, there is no longer a clamping force acting on the workpiece part. In the case of complete cancellation of the clamping, it is additionally also possible to cancel the mechanical contact between the ejector element and/or the counter-holding element and the workpiece part.

The inventors have recognized that a high probability of removal can be achieved by virtue of the fact that mechanical stresses are alternately built up and reduced again between the removal units and the workpiece part as well as the remainder of the workpiece/scrap skeleton. During the retry, the "sandwich" is thus partially or completely opened in various configurations and then reestablished during the interaction of the components. As a result, mechanical stresses can be relieved, thus enabling the workpiece part to be released from a jammed position. It is important here that no relative movements that might damage the removal units or the workpiece part are initiated during the interaction of the components. Typically, the clamping is released from one side, i.e. by reducing the force acting from this side and/or by moving the at least one ejector element or the at least one counter-holding element along the removal direction away from the workpiece part, thus canceling the mechanical contact between the ejector element or the counter-holding element and the workpiece part. In the context of this application, a movement along the removal direction is interpreted to mean a movement in and/or counter to the removal direction, i.e. a movement in the positive and/or the negative Z direction in the case of a removal direction extending in the direction of gravity (Z direction).

In a variant, the step of reducing/completely canceling the clamping and of resuming the clamping of the workpiece part is carried out multiple times. In general, the multiple build-up and subsequent relief of mechanical stresses increases the probability of removal.

In another variant, when canceling the clamping completely, contact between the ejector element and the workpiece part is first of all canceled. As a preferred option, the first step when releasing the clamping is that the ejector element exerting a mechanical pressure on the workpiece part is released from the workpiece part, such that the supporting effect of the counter-holder or of the counter-holding elements holding the workpiece part horizontal is maintained and the workpiece part does not tilt or slide relative to the remainder of the workpiece.

In another variant, the method additionally comprises: clamping the remainder of the workpiece between a workpiece support for supporting the remainder of the workpiece in the bearing plane and a further counter-holding element during the movement of the workpiece part along the removal direction, wherein the clamping of the remainder of the workpiece is preferably reduced or completely canceled before the reduction or complete cancellation of the clamping of the workpiece part. It has proven advantageous for removal if, in addition, the scrap skeleton is also fixed relative to the workpiece support, it being possible to achieve this by means of at least one (further) counter-holding element, which serves as a hold-down device. During the retry, the preload of the further counter-holding element against the scrap skeleton is also preferably canceled by reducing the contact force of the counter-holding element on the scrap skeleton or moving the further counter-holding element along the removal direction and in this way canceling the contact between the further counter-holding element and the remainder of the workpiece.

During the reduction or release of the clamping of the workpiece part and during the subsequent resumption of the clamping of the workpiece part, the workpiece part can remain in its position along the removal direction. Alternatively, it is possible to change the position of the workpiece part along the removal direction when the clamping of the workpiece has been released.

In one variant, during the release of the clamping, the workpiece part is fixed on the at least one counter-holding element of the counter-holding unit situated in a fixing state. In this case, the counter-holding unit can be designed, for example, as in German patent DE102014209811 B4, cited at the outset, which is incorporated in its entirety by reference into the subject matter of this application. In this case, the counter-holding unit can be switched between a fixing state for fixing the workpiece part on the counter-holding unit and a release state for releasing the workpiece part from the counter-holding unit. For this purpose, the counter-holding unit can, for example, comprise suction grippers to which a vacuum can be applied and which cooperate with a common counter-holding element or which serve as individual counter-holding elements. By fixing the workpiece part on the counter-holding unit or on the counter-holding element(s), the ejector element(s), which in this case engage on the underside of the workpiece part to press it against the counter-holding unit, can be lowered, thereby releasing the clamping, while the workpiece part remains in the position along the removal direction predetermined by the fixing on the counter-holding element. In this case, the clamping can be resumed by lifting the ejector element(s) again and pressing it (them) against the underside of the workpiece part to clamp it against the counter-holding unit. This buildup and reduction of the load can be repeated multiple times, if necessary, to completely separate the workpiece part from the remainder of the workpiece. In order to check whether the (electrically conductive) workpiece part has been completely separated from the (electrically conductive) remainder of the workpiece, and whether the workpiece part is fixed on the counter-holding unit situated in the fixing state, a sensor unit of the kind described in German patent DE102017205095B3 can be used, for example, which is incorporated in its entirety by reference into this application.

In another variant, when the clamping of the workpiece part has been canceled, the counter-holding unit moves the workpiece part in at least one direction perpendicular to the removal direction relative to the remainder of the workpiece and preferably additionally along the removal direction relative to the remainder of the workpiece. As explained in international patent disclosure WO2014023323A1, which is described at the outset, the release strategy or part of the release strategy can consist in moving the workpiece part with movements of relatively small amplitude in at least one spatial direction in the or parallel to the bearing plane (e.g. the X-Y plane) defined by the workpiece support. In particular, the movement can be an optionally jerky backward and forward movement of the workpiece part relative to the remainder of the workpiece. A movement along the removal direction (in the Z direction) of relatively small amplitude can be superimposed on the movement parallel to the bearing plane. In particular, this movement in the removal direction can be an alternating raising and lowering movement of the workpiece part. The movement of the counter-holding unit with the clamping canceled can take place, in particular, when the workpiece part is fixed on the counter-holding unit situated in the fixing state, as described further above.

In another variant, the workpiece part is clamped by means of a plurality of counter-holding elements of the counter-holding unit, which are each moved in opposite senses along the removal direction in order to separate the workpiece part from the remainder of the workpiece. This variant takes advantage of the fact that the counter-holding elements, which cooperate to support the workpiece part to be removed, can be moved or displaced individually along the removal direction, especially if they are designed as support slides as described further below. By means of an opposed movement of the counter-holding elements along the removal direction over a comparatively short travel distance of a few millimeters, workpiece parts can be "jogged free" from the remainder of the workpiece. Here, the opposed movement of the counter-holding elements can take place simultaneously or with a time offset.

In the method described in German patent DE102014209811 B4 for removing the workpiece part from the remainder of the workpiece, the workpiece part is preloaded by an ejection unit situated below the bearing plane and, in the process, is supported by a counter-holding unit arranged above the bearing plane, which can be switched between a fixing state and a release state. In this case, the ejection unit serves as a lifting unit for lifting the workpiece part into a removal position which is situated above the bearing plane. However, the reverse situation is also possible, i.e. where the workpiece part is lowered into a removal position below the bearing plane, as described below.

In one variant of the method, a supporting surface of the at least one counter-holding element, said supporting surface supporting the workpiece part, is lowered below the bearing plane of the remainder of the workpiece as the workpiece part is moved along the removal direction, and the at least one ejector element presses against the workpiece part from above during the lowering process. In this variant of the method, the workpiece part is lowered during the movement out of the bearing plane along the removal direction. In this case, the at least one ejector element presses on the upper side of the workpiece part to fix the workpiece part on the supporting surface of the counter-holding element as it is lowered. In this case, the counter-holding element on which the supporting surface is formed can be, for example, a support slide of a machine for separative machining of a plate-shaped workpiece, as described in published, non-prosecuted German patent application DE102016208872A1 cited at the outset, which is incorporated in its entirety by reference into this application. In the case of the machine described there, the supporting surface can be lowered below the bearing plane—generally together with the support slide. The workpiece part can rest on a plurality of support slides, preferably two such slides, which can be lowered together but can also be moved in opposite senses along the removal direction.

The ejector element may be a piston rod of an ejection unit in the form of an ejection cylinder mounted on a machining head of the machine. The ejection cylinder can be moved along the removal direction by a movement of the machining head, and the ejector element in the form of the piston rod can be moved relative to the ejection cylinder at least between an upper and a lower end position.

It is understood that a large number of other embodiments of the counter-holding unit and/or of the ejection unit are possible, which cannot be comprehensively explained in the present application.

In another variant, the method comprises: moving the workpiece part along the removal direction with canceled clamping into the bearing plane of the remainder of the workpiece, resuming the clamping of the workpiece part between at least one ejector element of the ejection unit and at least one counter-holding element of the counter-holding unit, and renewed moving of the clamped workpiece part along the removal direction, preferably at a speed which differs from the speed during the moving of the workpiece part along the removal direction.

In this case, the release of the clamping is used to move the workpiece part back into the bearing plane, where the workpiece is re-clamped, i.e. for another removal attempt, the workpiece part is moved into the initial position along the removal direction, in which the initial or a preceding removal attempt was also started. From this initial position of the workpiece part in the bearing plane, a "sandwich removal" or retry is performed again, i.e. the workpiece part is moved again in the removal direction into a removal position. In order to increase the probability of removal during the repeated removal attempt, the speed of the movement of the workpiece part is usually changed, with the movement along the removal direction being carried out either more slowly, i.e. at a lower speed, or at a higher speed, possibly jerkily, i.e. with higher acceleration. Even with such a jerky movement with a high acceleration, typically both the counter-holding element or counter-holding unit and the ejector element or elements move jerkily but synchronously, ensuring that the workpiece part remains clamped. For example, in the case of a jerky, controlled movement of the counter-holding unit, the ejector elements, which are designed, for example, in the form of ejector pins, can also follow the controlled jerky movement of the counter-holding unit, even if they themselves are not moved in a controlled manner in the removal direction. In this case, the ejector elements are usually subjected to a pneumatic pressure to bring about the ejection or lifting of the workpiece part, the pressure being sufficient to clamp the workpiece part even in the case of a jerky movement or to produce a movement synchronous with the movement of the counter-holding unit.

Individual or all method steps of the retry method described above can also be repeated several times until a respectively predefined number of repetitions is reached. In the event that even the last step of the retry method does not result in successful removal of the workpiece part, machining is typically stopped and an error message is output.

In another variant, the method comprises: storing geometric parameters of the workpiece part to be removed, of a removal result and of operating parameter sets of the at least one ejector element and/or of the at least one counter-holding element during the cancellation and subsequent resumption of the clamping of the workpiece part and preferably of the remainder of the workpiece and/or during the renewed moving of the workpiece part along the removal direction in a result memory. Storing the removal result in the result memory can optionally consist in storing the geometric parameters of the workpiece part to be removed and the associated operating parameters in the result memory only if the removal result is positive. The removal result is typically a binary value, e.g. "removal successful" or "removal unsuccessful". In the event that the operating parameter sets and the geometry parameters are stored in the result memory even in the event of an unsuccessful removal, it is also necessary to store the removal result in the result memory in addition.

In this variant of the method, a relationship between geometric parameters or the geometry of the workpiece part to be removed and the successful method step or steps can be determined by analysis of the retry method, e.g. within the machine control system or in separate computer-implemented programming software or by means of a cloud-based application program, by means of which relationship the method can be modified in such a way for new workpiece parts to be removed that only the successful steps are employed. This leads to a time saving in the removal of parts. For this purpose, data are collected in the result memory, e.g. in the machine control system, on a central computer or in the cloud, in respect of which part geometry which retry steps lead to successful part removal or with which operating parameters the removal units, i.e. the ejection unit or the ejector elements thereof and/or the counter-holding unit or the counter-holding elements thereof, should be activated by a control unit to ensure that removal is successful.

In the simplest case, the operating parameters of the operating parameter sets can be the initial and/or end positions of the removal units or of the removal elements thereof. In addition, the operating parameters can contain information on the speed of the movement of the ejector element or elements and/or of the counter-holding element or elements during the movement along the removal direction. Through evaluation of the data from many machines, it is possible in this way to determine relationships between the part geometry and actually required retry steps. There may optionally be a number of predefined operating parameter sets for the retry in the device, and the operating parameters stored in the result memory are an index for the selection of a respective predefined operating parameter set.

In another variant, the method comprises: automatically generating a removal forecast for a workpiece part to be removed on the basis of geometric parameters of the workpiece part to be removed and of the geometric parameters, stored in the result memory, of already removed workpiece parts and a respectively associated removal result. With the aid of the result memory, it is possible in this case to generate the success probability of removal for additional workpiece parts to be removed based on their geometry or to create a removal forecast, as described in published, non-prosecuted German patent application DE102018208126.3, for example. In the creation of the control program for a device for removal, e.g. in the form of a laser processing machine, the forecast can be created either in the machine control system or in the programming system, which is usually implemented as software in a computer independent of the machine control system, and a warning can be output if successful part removal is not to be expected. Proposals for suitable changes to the part contour or to the geometric parameters of the workpiece part can furthermore be made to the programmer.

In another variant, the method comprises: automatically selecting operating parameter sets, stored in the result memory, in dependence of geometric parameters of the workpiece part to be removed. Through the analysis of knowledge obtained from many machines on the relationships between part geometry and successful retry steps, which are each described by an operating parameter set or correspond to an operating parameter set, these relationships can be implemented in the machine control system or in the programming system, thus enabling it to select the most expedient retry strategy for similar workpiece parts. For this purpose, the result memory is read out by the device, or the data in the result memory are transferred to the programming system. In this way, instead of a rigid predefined sequence of retry steps that are carried out sequentially in order to remove the workpiece part, a sequence of retry steps that is optimized for the respective geometry of the workpiece part to be removed can be carried out, or an optimized operating parameter set or an optimized sequence of operating parameter sets can be selected.

A further aspect of the invention relates to a device of the type stated at the outset, further comprising: a control unit which is configured to control the ejection unit and/or the counter-holding unit in order to move the workpiece part, which is clamped between at least one ejector element of the ejection unit and at least one counter-holding element of the counter-holding unit, along the removal direction, and, in the case where it is determined, when checking whether the workpiece part has been completely separated from the remainder of the workpiece during the movement along the removal direction, that the workpiece part has not been completely separated from the remainder of the workpiece, to cancel the clamping of the workpiece part and subsequently to resume the clamping of the workpiece part.

The device for removing the workpiece part from the remainder of the workpiece can be a machine for separative machining of a workpiece, as described in the initially cited published, non-prosecuted German patent application DE102016208872A1, for example. In this case, the removal of the workpiece part can take place via a gap formed between two workpiece supporting surfaces. The device for removal can also form a machine arrangement together with such a machine for separative machining of the kind described in the initially cited DE102014209811B4. In this case, the machine for separative machining and the device for removing the workpiece part can have a common workpiece support, which defines the bearing plane for the workpiece or the remainder of the workpiece.

In one embodiment, the control unit is connected to a result memory or contains said memory and is configured to generate an automated removal forecast for the removal probability of a workpiece part to be removed on the basis of geometric parameters of the workpiece part and of geometric parameters, stored in the result memory, of already removed workpiece parts and a respectively associated removal result. With the aid of the result memory, the removal forecast for the workpiece part to be removed can be based on the respective removal result for workpiece parts with similar geometric parameters that have already been removed.

In another embodiment, the control unit has operating parameter sets of the at least one ejector element and/or of the at least one counter-holding element during the reduction or complete cancellation of the clamping of the workpiece part and during the subsequent resumption of the clamping of the workpiece part and/or during the renewed movement of the workpiece part along the removal direction for a plurality of workpiece parts having different geometric parameters, and the control unit is configured to select at least one operating parameter set for the removal of the workpiece part from the remainder of the workpiece on the basis of the geometric parameters of the workpiece part to be removed. Typically, the operating parameter set selected is one which belongs to a workpiece part whose geometric parameters are as similar as possible to the geometric parameters of the workpiece part to be removed.

Other features which are considered as characteristic for the invention are set forth in the appended claims.

Although the invention is illustrated and described herein as embodied in a method and a device for removing a workpiece part from the remainder of the workpiece, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 2A-2G are schematic illustrations of a number of steps of a method for removing a workpiece part cut free from the scrap skeleton;

DETAILED DESCRIPTION OF THE INVENTION

In the following description of the drawings, identical reference signs are used for components which are the same or functionally the same.

Figure 1:
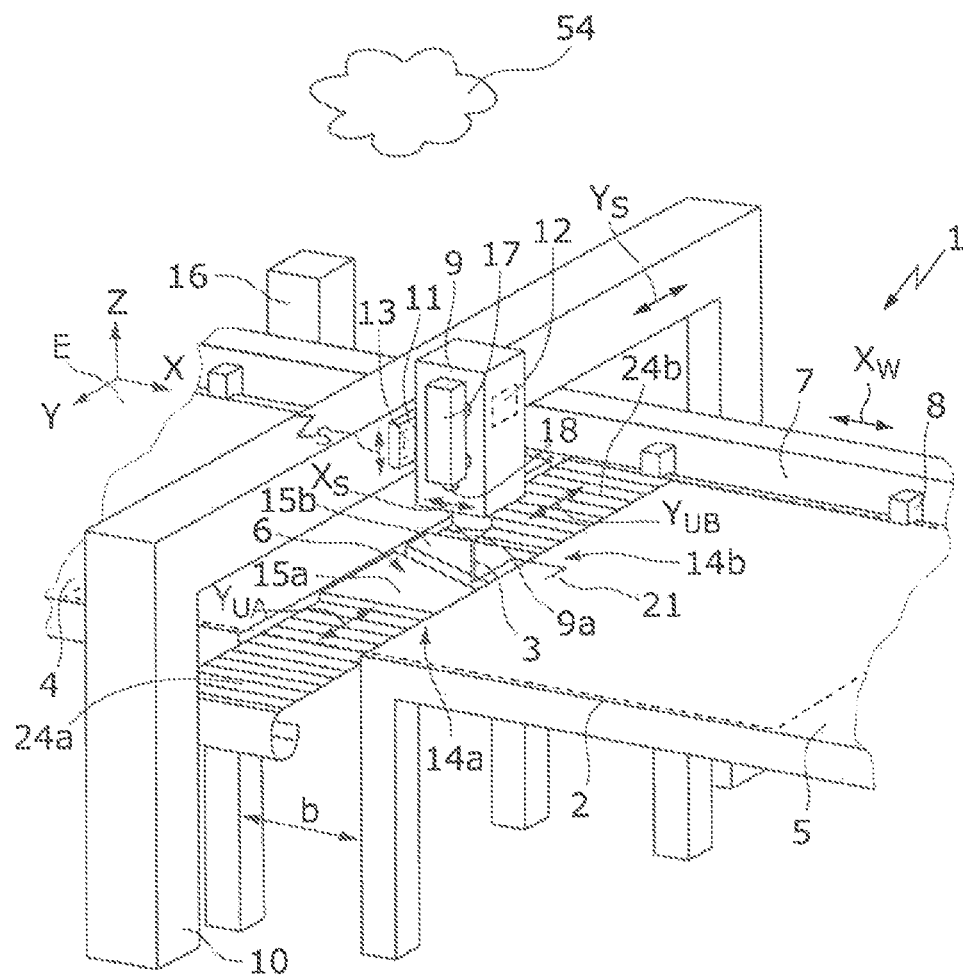
FIG. 1 is a diagrammatic, perspective view of a machine for laser machining having two fixed workpiece supporting surfaces, between which is formed a gap which extends in a Y direction and in which two support slides that act as counter-holding elements for an ejection unit mounted on a machining head can be moved.

Referring now to the figures of the drawings in detail and first, particularly to FIG. 1 thereof, there is shown an illustrative construction of a device 1 for laser machining, to be more precise for laser cutting, of a plate-shaped workpiece 2, illustrated in dashed lines, by means of a machining beam in the form of a laser beam 3. To cut the workpiece 2, it is also possible to replace the laser beam 3 with some other kind of thermal machining beam or jet, e.g. a plasma torch or a water jet. Alternatively, it is also possible for the device 1 to be designed for mechanical separation of the workpiece 2, e.g. as a punching machine or as a punching/laser combination machine.

During machining, the workpiece 2 rests on two fixed workpiece supporting surfaces 4, 5, which, in the example shown, form the upper sides of two workpiece tables and define a workpiece bearing plane E (X-Y plane of an XYZ coordinate system) for supporting the workpiece 2. By means of a conventional movement and holding unit 7, which has a drive and clamping devices 8 in the form of clamping jaws for holding the workpiece 2, the workpiece 2 can be moved in a controlled manner on the workpiece supporting surfaces 4, 5 in a first direction X (referred to below as the X direction) and moved to a predefined workpiece position XW. In order to facilitate the movement of the workpiece 2 in the X direction, brushes, balls or slide rollers, which form the actual workpiece supporting surfaces 4, 5, can be mounted on the workpiece tables shown in FIG. 1.

A gap 6 bounded laterally by the fixed workpiece supporting surfaces 4, 5 is formed between the two fixed workpiece supporting surfaces 4, 5. The gap 6 extends in a second direction (referred to below as the Y direction) over the entire width of the two workpiece supporting surfaces 4, 5. A laser cutting head 9, which aligns and focuses the laser beam 3 on the workpiece 2, can be moved in a controlled manner in the Y direction by means of a motor-driven slide 11 serving as a movement device, which is guided on a fixed gantry 10. In the example shown, the laser cutting head 9 can also additionally be moved in the X direction and can be moved in a controlled manner in the X direction by means of an additional movement device 12, e.g. in the form of a linear drive, mounted on the slide 11.

By means of the superimposed movement devices 11, 12, the laser cutting head 9 can be positioned both in the X direction and in the Y direction at a desired cutting head position XS, YS within the gap 6. In addition, in the example shown, the laser cutting head 9 can be moved along a third direction of movement Z (direction of gravity, hereinafter: Z direction or removal direction) by means of a third movement device 13, for example in the form of a linear drive, which is superimposed on the second movement device 12, in order to adjust the distance between a cutting nozzle 9a of the laser cutting head 9 and the surface of the workpiece 2 or in order to position the laser cutting head 9 at a desired cutting head position ZS in the Z direction relative to the workpiece bearing plane E.

Here, the controlled movement of the machine components in each case takes place both in the positive and in the negative X, Y and Z directions.

To provide additional support to the workpiece 2 and to support workpiece parts 20 cut during separation machining, two support slides 14a, 14b are arranged in the gap 6 shown in FIG. 1. The two support slides 14a, 14b each extend over the entire width b of the gap 6 and can be moved in a controlled manner and independently of one another in the gap 6 in the positive and negative Y directions. The controlled movement of the support slides 14a, 14b between the lateral edges of the fixed workpiece supporting surfaces 4, 5 can be accomplished by means of spindle drives, for example, wherein the spindle nut is mounted on the respective support slide 14a, 14b, and the spindle and the drive motor are mounted on one of the two fixed workpiece supports 4, 5. It is understood that the controlled movement of the support slides 14a, 14b can also be achieved in some other way.

The support slides 14a, 14b can each be moved in the gap 6 to a desired position YUA, YUB along the second direction Y in order at that location to support the workpiece 2 and workpiece parts 20 to be cut free from the workpiece 2 or that have been cut free during machining by means of a supporting surface 15a, 15b formed on the respective support slide 14a, 14b. In the case shown, the supporting surface 15a, 15b of each support slide 14a, 14b ends flush with the workpiece supporting surfaces 4, 5 in the Z direction, i.e. the supporting surfaces 15a, 15b of the support slides 14a, 14b are located in the bearing plane E for the workpiece 2.

In the example shown in FIG. 1, a covering element 24a, 24b for covering the gap 6 between the two workpiece supporting surfaces 4, 5 is mounted on each of the lateral edges of the supporting surfaces 15a, 15b of the support slides 14a, 14b which extend in the X direction and face away from each other. The covering elements 24a, 24b extend over the entire width b of the gap 6, are taken along in the Y direction during the movement of the support slides 14a, 14b and are of roller shutter-like design in the example shown.

In order to provide better support for workpiece parts 20 that have long tongue-shaped partial regions that extend in the X direction or in the Y direction, the two mutually facing, parallel-aligned lateral edges of the supporting surfaces 15a, 15b of the two supporting slides 14a, 14b are aligned obliquely, i.e. at an angle both to the X direction and to the Y direction, in the example shown in FIGS. 2A-2G.

To control the cutting operation, the device 1 has a control unit 16, typically in the form of a CNC controller, which is used to coordinate the movements of the workpiece 2, of the laser cutting head 9, and of the support slides 14a, 14b in order to set a desired workpiece position XW, a desired cutting head position XS, YS, ZS, and a desired position YUA, YUB of the support slides 14a, 14b to enable cutting of a predefined cutting contour 21 and to adequately support the workpiece 2. The control unit 16 can be based on the Siemens SINUMERIK 840D si CNC controller, for example. In the example shown, the control unit 16 also serves to control an ejection unit 17 secured on the side of the laser cutting head 9, which is designed in the form of an ejector cylinder, the piston rod of which serves as an ejector element 18 for ejecting separated workpiece parts 20 or for removing them from the bearing plane E of the workpiece 2, as will be described below with reference to FIGS. 2A-2G In this arrangement, the two support slides 14*a*, 14*b* form counter-holding elements of a counter-holding unit 19, which has a controlled drive and enables movement of the two support slides 14*a*, 14*b* in the removal direction (Z direction).

FIG. 2A shows a workpiece part 20 cut free from the remainder 2*a* of the workpiece (scrap skeleton) by means of the laser beam 3, the workpiece part being supported by the two support slides 14*a*, 14*b*. After the laser beam 3 was switched off, the laser cutting head 9 was moved in the Y direction by means of the second movement device 12 and in the X direction by means of the third movement device 13 within the gap 6 until the position shown in FIG. 2A was reached, in which the ejector element 18 is positioned above an ejection position AP. The laser cutting head 9 and thus also the ejection unit 17 (also referred to below as the ejector cylinder) were moved simultaneously upward in the Z direction by means of the fourth movement device 13 in order to increase the distance from the upper side 20*a* of the separated workpiece part 20 and from the remainder 2*a* of the workpiece.

During this process, the laser cutting head 9 was moved upward by a distance sufficient to enable the ejector element 18 to be moved out of a first, retracted position S1 shown in FIG. 2A, in which the ejector element 18 (also referred to below as the piston rod) does not protrude downward beyond the laser cutting head 9, to be more precise beyond the cutting nozzle 9*a*, into a second, extended position S2 shown in FIG. 2B, in which the ejector element 18 protrudes beyond the cutting nozzle 9*a*.

The ejector element 18, designed as a piston rod, of the ejector cylinder 17 is moved by means of an actuator from the first, upper position S1, which forms an upper end position, into the second, lower position S2, which forms a lower end position of the ejector element 18. In the example shown, the ejector cylinder 17 is a pneumatic cylinder, to which a working gas is supplied in order to move the piston rod 18. The ejector cylinder 17 can therefore serve as a pneumatic spring, i.e. the piston rod 18 can be pushed upward against a spring force in the second position S2 when it is placed on the upper side 20*a* of the separated workpiece part 20 and presses against said part. Alternatively, a motor drive can be used as an actuator, bringing about movement of the ejector element 18 via a shaft, for example. In this case, the ejector element 18 is typically locked or fed in in the second position S2, thus preventing it from being moved upward from the second position S2, i.e. in the direction of the first position S1.

In the example shown, the machining head 9 is moved downward until the piston rod 18 of the ejector cylinder 17 presses against the upper side 20*a* of the separated workpiece part 20. During this process, the piston rod 18 is pushed back out of the second position S2 shown in FIG. 2B into an intermediate position ZS shown in FIG. 2C, which is displaced in the direction of the first position S1 relative to the second position S2. Owing to the pressure which the piston rod 18 exerts on the separated workpiece part 20 in the intermediate position ZS, said part is pressed out of the (remainder of the) workpiece 2 if the two support slides 14*a*, 14*b* are lowered downward out of the workpiece bearing plane E, as illustrated in FIG. 2D.

The intermediate position ZS is chosen so that, during the synchronous lowering of the two support slides 14*a*, 14*b* below the workpiece bearing plane E, the piston rod 18 can be extended to such an extent that it still presses against the upper side 20*a* of the separated workpiece part 20 and fixes the latter in its horizontal position, even in the lower end position of the support slides 14*a*, 14*b* shown in FIG. 2D. Alternatively or in addition, the machining head 9 can also be lowered (in particular synchronously) by a certain distance as the support slides 14*a*, 14*b* are lowered in order to maintain the preloading of the piston rod 18 situated in the intermediate position ZS against the workpiece part 20, thus ensuring that said part is clamped between the piston rod 18 acting as an ejector element and the support slide/s 14*a*, 14*b* acting as counter-holding element(s) during the movement in the Z direction, which forms a removal direction.

The support slides 14*a*, 14*b* are lowered until they have reached their lower end position shown in FIG. 2D. In the example shown in FIG. 2D, a lower end position ES of the piston rod 18 is not reached during this process, i.e. the removal of the workpiece 20 was not successful: the workpiece part 20 has jammed in the remainder 2*a* of the workpiece and is therefore not resting on the support slides 14*a*, 14*b* situated in the lower end position thereof. To check whether the separated workpiece part 20 has been fully ejected from the remainder 2*a* of the workpiece, the ejector cylinder 17 has a sensor unit 25, which can be designed as a displacement sensor, for example, and which determines the position or location of the ejector element 18 relative to the lower end of the ejector cylinder 17.

The lower end position ES of the ejector element 18 may be set back relative to the second position S2 in the direction of the lower end of the ejector cylinder 17, or may coincide therewith, depending on whether the ejector element 18 is feedable or resiliently supported in the second position S2. Checking whether the end position ES of the ejector element 18 has been reached can be performed in various ways and optionally with different sensor units. For details in respect of checking whether the end position ES has been reached, attention is drawn to the initially cited DE102016208872A1.

Figure 2E:
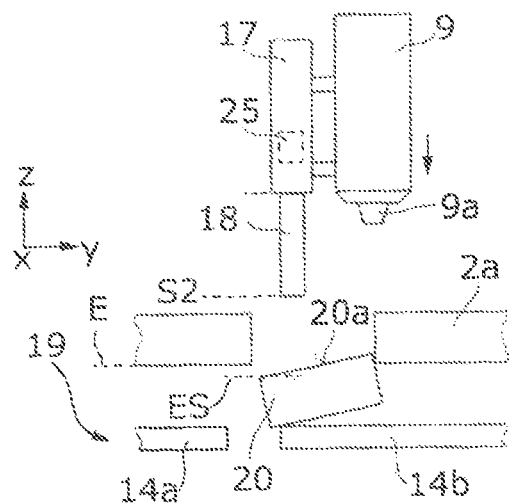

For the case shown in FIG. 2G where the check shows that removal was not successful, that is to say that the workpiece part 20 is jammed on the remainder 2*a* of the workpiece and therefore has not been completely separated from the remainder 2*a* of the workpiece, a repeat strategy (retry strategy) is employed, and this is described below in conjunction with FIGS. 2*e-g*:

As can be seen in FIG. 2E, the clamping of the workpiece part 20 between the piston rod 18 serving as an ejector element and the support slide 14*b* serving as a counter-holding element is completely canceled in a first step since the piston rod 18 is moved upward, i.e. in the positive Z direction, by a movement of the cutting head 9. Alternatively, the clamping of the workpiece part 20 can (initially) only be reduced by reducing the force applied to the workpiece part 20 by the piston rod 18, e.g. by controlling the pressure by means of a proportional valve. It is possible in this way to dissipate stresses in the workpiece part 20. The two support slides 14*a*, 14*b* are then raised in order to bring the workpiece part 20 back into the bearing plane E of the workpiece 2 and of the remainder 2*a* of the workpiece.

Figure 2F:
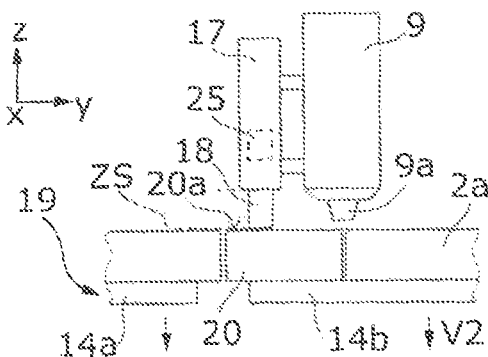

In a further step, the clamping of the workpiece part 20 is resumed by increasing the contact pressure of the ejector element 18 again or by lowering the ejector element 18 on to the upper side 20*a* of the workpiece part 20, as illustrated in FIG. 2F. The initial position shown in FIG. 2F corresponds to the initial position shown in FIG. 2C during the first removal attempt. From the initial position shown in FIG. 2F, another attempt is made to remove the workpiece part 20 from the remainder 2a of the workpiece.

For this purpose, the workpiece part 20 clamped between the ejector element 18 and the counter-holding element 14b is once again lowered downward, i.e. along the removal direction Z. In the repeated removal attempt, the lowering of the workpiece part 20 takes place at a speed v2 which differs from the speed v1 in the first removal attempt. In the example shown, the workpiece part 20 is lowered more slowly in the renewed removal attempt, i.e. at a lower speed v2, than in the first removal attempt (v2<v1). It is understood, however, that the reverse case is also possible, i.e. the selected speed v2 in the second removal attempt can be higher than the speed v1 in the first removal attempt.

Figure 2G:
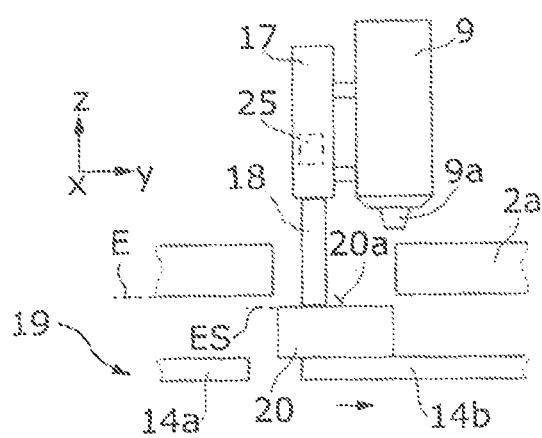

In the second removal attempt, the lower end position ES of the ejector element 18 is reached, as illustrated in FIG. 2G, i.e. the workpiece part 20 is released completely from the remainder 2a of the workpiece and rests on the support slide 14b serving as a counter-holding element. In this case, as soon as the support slides 14a, 14b have reached their lower end position, the piston 18 can be moved back out of its lower end position ES into the first position S1 shown in FIG. 2A. For ejection, the separated workpiece part 20 can be moved below the workpiece bearing plane E in the gap 6, for example, by moving the second support slide 14b in the Y direction until an ejection position (not shown) is reached, in which the separated workpiece part 20 is ejected downward.

In the event that, other than as described above, the second removal attempt was unsuccessful, the repeat strategy described above in conjunction with FIG. 2E and FIG. 2F, in which the clamping of the workpiece part 20 is reduced or completely canceled and then resumed, may be repeated at least one additional time until removal is successful or until a predefined number of repetitions is achieved. If no removal attempt was successful, then, after the predefined number of attempts (retries) has been reached, the machining of the workpiece 2 is stopped and an error message is output.

If the workpiece part 20 is resting on both support slides 14a, 14b serving as counter-holding elements, then it is possible, in a supplementary method step, after reducing or completely canceling the clamping by the ejector element 18, for an opposed traversing movement of the support slides 14a, 14b by a few millimeters along the removal direction, i.e. short up and down movements of the support slides 14a, 14b in the Z direction, to be performed. By means of the opposed movement of the support slides 14a, 14b, the workpiece part 20 can be "jogged free" from the remainder 2a of the workpiece. In this case, the opposed movement can be simultaneous or staggered, or in a form such that only one of the slides 14b supporting the workpiece part 20 performs the traversing movement, while the other slide 14a does not move.

The removal or ejection of workpiece parts 20 via the gap 6 in a reliable process is only possible if the workpiece parts 20 do not have dimensions that are too large, i.e. in general do not have a width that is greater than the width b of the gap 6. For the removal of larger workpiece parts 20, a device 26 can be used for removal which is arranged adjacent to the gantry 10 in the X direction and extends above and below the workpiece supporting surface 5 and which is described below in conjunction with FIG. 3. After a workpiece part 20 has been cut free from the workpiece 2 by means of the laser cutting head 9 shown in FIG. 1, the remainder 2a of the workpiece formed during the separative machining is moved together with the cut-free workpiece part 20 in the X direction by means of the holding and movement device 7 until both have reached an unloading position shown in FIG. 3. By means of the device 26, the workpiece part 20 is to be removed from the remainder 2a of the workpiece before the workpiece part 20 can be transported out of the vicinity of the machine tool 1. During this process, the remainder 2a of the workpiece remains on the workpiece supporting surface 5 (cf. FIG. 1) before it is also removed from the vicinity of the machine tool 1 after all the workpiece parts have been removed.

The plate-like workpiece support 27, on the upper side of which the workpiece supporting surface 5 is formed, serves as a workpiece support for the remainder 2a of the workpiece and the workpiece part 20. The points of support of the machined workpiece 2 on the brushes or the rollers of the workpiece support 27 define the bearing plane E, indicated in FIG. 3, of the workpiece support 27, along which the workpiece part 20 and the remainder 2a of the workpiece are in alignment.

Figure 3:
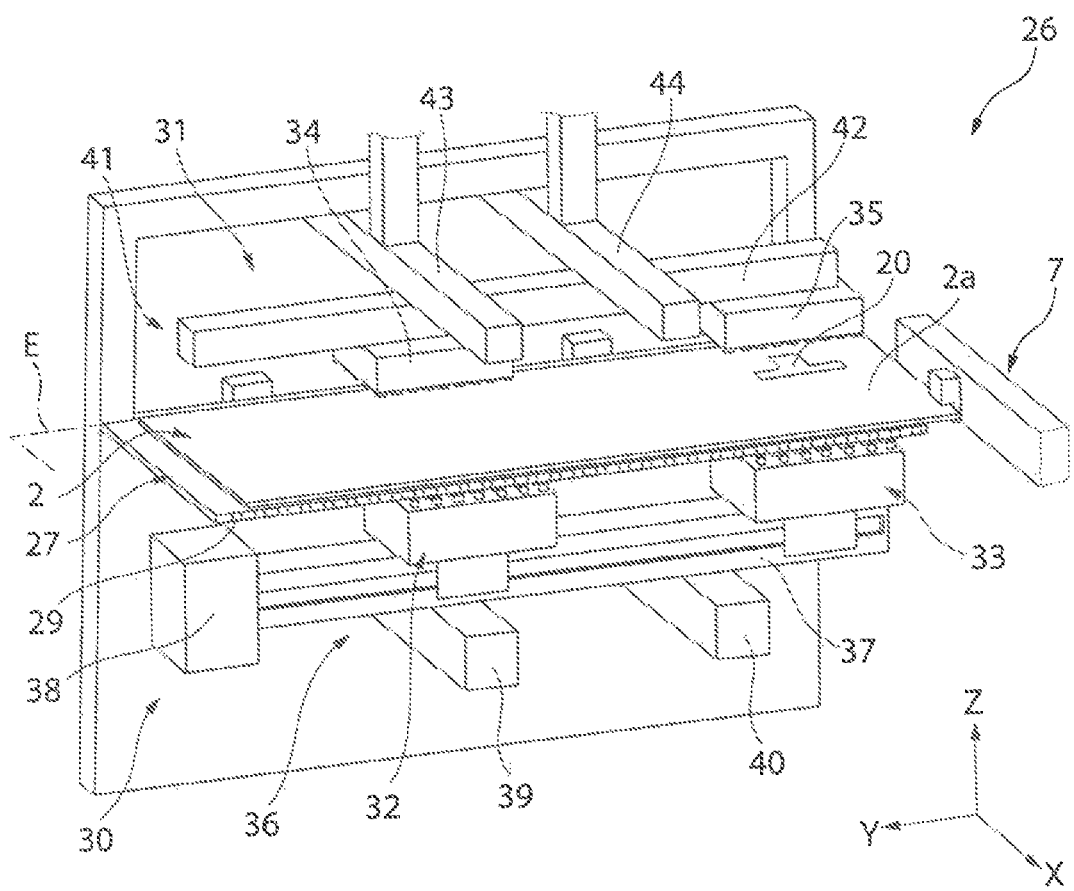
FIG. 3 is a perspective view of a device for removing a workpiece part separated from the remainder of the workpiece, having two ejection units and counter-holding units in each case.

As is apparent from FIG. 3, the workpiece support 27 of the machine tool 1 is designed as a perforated plate with a multiplicity of through openings 29 in the example illustrated. Arranged below the workpiece support 27 is an ejection device 30, and arranged above the workpiece support 27 is a counter-holding device 31. The ejection device 30 comprises two ejection units 32, 33 of identical construction, and the counter-holding device 31 comprises two counter-holding units 34, 35 of identical construction.

The ejection units 32, 33 can be fed parallel to the bearing plane E to any desired point below the workpiece support 27 by means of an ejection movement unit 36. For this purpose, the ejection-movement unit 36 has a longitudinal rail 37, along which the ejection units 32, 33 can be moved under motor power. A drive motor 38 of the ejection units 32, 33 can be seen in FIG. 3. Together with the ejection units 32, 33, the longitudinal rail 37 can be moved on two transverse rails 39, 40 of the ejection-movement unit 36, which extend perpendicularly to the longitudinal rail 37. The transverse rails 39, 40 can be raised and lowered perpendicularly to the workpiece support 27 and the bearing plane E (in removal direction Z) together with the longitudinal rail 37 and the ejection units 32, 33 guided by said rail.

The counter-holding units 34, 35 of the counter-holding device 31 can move to any desired point on the machined workpiece 2 in a corresponding manner parallel to the bearing plane E and can be raised and lowered perpendicularly to the bearing plane E. A counter-holding-movement unit 41 comprises a longitudinal rail 42, along which the counter-holding units 34, 35 can be fed in under motor power. Together with the counter-holding units 34, 35, the longitudinal rail 42 can be moved under motor power along two transverse rails 43, 44, which, for their part, extend perpendicularly to the longitudinal rail 42 and can be raised and lowered in the vertical direction (Z direction) together with the longitudinal rail 42 and the counter-holding units 34, 35 guided thereon.

All the significant functions of the machine 1 and thus, in particular, also all the significant functions of the device 26 are numerically controlled by means of the control unit 16 shown in FIG. 1, which can be based on the Siemens SINUMERIK 840D si CNC controller, for example.

Figure 4A:
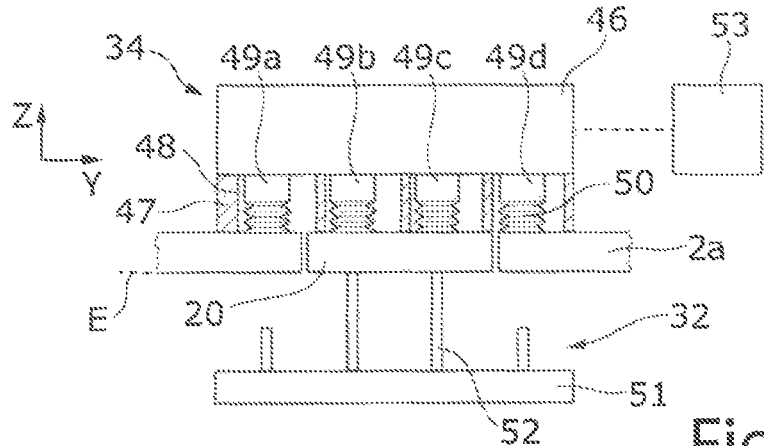
FIGS. 4A-4E are schematic illustrations of several steps of a method for removing the separated workpiece part with the aid of the device in FIG. 3.

As can be seen in FIGS. 4A-4E, which each show the first counter-holding unit 34 from FIG. 3 and the first ejection unit 32 interacting therewith, the counter-holding unit 34 has a box-type housing 46 with a flat contact plate 47, which serves as a supporting body or as a counter-holding element and is provided with a multiplicity of holes 48. The holes 48 receive counter-holding elements in the form of suction grippers 49*ad*, which can be designed as passive suction units and have suction sleeves 50 that are elastically deformable perpendicularly to the contact plate 47. In FIG. 4A, two suction sleeves 50 of the second and third suction gripper 49*b*, 49*c* rest on the workpiece part 20, while the first and the fourth suction gripper 49*a*, 49*d* rest on the remainder 2*a* of the workpiece.

The first of the two ejection units 32, 33 of identical construction shown in FIGS. 4A-4E has an ejection housing 51, at which the ejection units 32, 33 are attached to the longitudinal rail 37 of the ejection-movement unit 36. A plurality of conventional pneumatic piston-cylinder units (not shown specifically in the figures), each having a double acting cylinder, is accommodated in the interior of the ejection housing 51. Connected to each of the pistons is an ejector element in the form of an ejector pin 52.

The piston-cylinder units in the interior of the ejection housing 51 can be controlled separately and can be connected independently of one another to a pressure source (not shown specifically). By actuation of the piston-cylinder units, the ejector pins 52 are extended from the ejection housing 51 or retracted into the ejection housing 51 in the vertical direction. At the maximum, the cross section of the ejector pins 52 may correspond to the cross section of the through openings 29 in the workpiece support 27 (cf. FIG. 3). In the illustrative case shown, the cross section of the ejector pins 52 is smaller than the cross section of the through openings 29.

The removal process for the workpiece part 20 from the remainder 2*a* of the workpiece is described below, wherein it is assumed that the workpiece part 20, the ejection unit 32 and the counter-holding unit 34 are positioned at a suitable removal position in the XY plane for removal, as illustrated in FIGS. 4A-4E.

During the removal process, the vacuum generator for the counter-holding unit 34 is first of all switched off, and the suction grippers 49*a*-*d* on the counter-holding unit 34 are moved away from the workpiece part 20 and also from the remainder 2*a* of the workpiece. Consequently, the suction grippers 49 are in an out-of-service state, and therefore the counter-holding unit 34 is in a release state. In this functional state, the counter-holding unit 34 is lowered by means of a corresponding vertical movement of the counter-holding-movement unit 41 and, as a result, is placed on the machined workpiece 2 or on the workpiece part 20 and the remainder 2*a* of the workpiece. In this case, the suction sleeves 50 of the suction grippers 49*a*-*d* are compressed and, as a consequence, folded to a greater extent and pushed back into the interior of the holes 48 in the contact plate 47 of the counter-holding unit 34 until, finally, the contact plate 47 of the counter-holding unit 34 lands on the surface of the workpiece part 20 and of the remainder 2*a* of the workpiece.

Those ejector pins 52 on the ejection unit 32 which are below the workpiece part 20 and to which the workpiece part 20 is accessible via through openings 29 in the workpiece support 27 are then actuated. The other ejector pins 52 of the ejection unit 32 retain their initial position. The ejection unit 32 is raised into the position shown in FIG. 4A, with the ejector pins 52 extended from the ejection housing 51, by means of a corresponding lifting movement of the ejection-movement unit 36. During this process, the extended ejector pins 52 are placed against the underside of the workpiece part 20. The workpiece part 20 is then acted upon on its underside in a removal direction Z by the ejection unit 32, and is supported over a large area in the removal direction Z on its upper side by the counter-holding unit 34, to be more precise by the contact plate 47 acting as a counter-holding element. The suction grippers 49 of the counter-holding unit 34, which remain as before in the out-of-service state, rest on the upper side of the workpiece part 20, which is aligned parallel to the workpiece plane E, with a preload resulting from their elastic deformation.

A control signal has the effect that the ejection unit 32 and the counter-holding unit 34 are moved synchronously with a removal movement in the removal direction Z by means of the ejection-movement unit 36 and the counter-holding unit-movement unit 41. During this process, the workpiece part 20, which is initially arranged in the bearing plane E of the remainder 2*a* of the workpiece, is raised from the remainder 2*a* of the workpiece, wherein it remains clamped between the ejector pins 52 and the suction grippers 49*a*-*d* acting as counter-holding elements or the contact plate 47, likewise acting as a counter-holding element, of the counter-holding unit 34. By means of the other two suction grippers 49*a,d*, the remainder 2*a* of the workpiece is also pressed against the workpiece support 27 from above during the removal process for the workpiece part 20. As a supplementary measure, the second counter-holding unit 35 can be positioned as a hold-down device in the XY plane adjacent to the counter-holding unit 34 and lowered onto the remainder 2*a* of the workpiece, with the result that the remainder 2*a* of the workpiece is clamped between the workpiece support 27 and the contact plate, acting as a further counter-holding element, of the second counter-holding unit 35.

The device 26 has a sensor unit 53, which makes it possible to check whether the workpiece part 20 has been completely separated from the remainder 2*a* of the workpiece or whether there is still an electrically conductive connection between the workpiece part 20 and the remainder 2*a* of the workpiece after it has been raised from the remainder 2*a* of the workpiece by means of the lifting movement described above. For this purpose, the sensor unit 53 can be designed in the manner illustrated in DE102017205095B3 cited above, for example. If the sensor unit 53 detects that the workpiece part 20 has been completely separated from the remainder 2*a* of the workpiece, the vacuum generator of the counter-holding unit 34 can be activated in order to transfer it from the release state to a fixing state, in which the workpiece part 20 is secured or fixed on the counter-holding unit 34, to be more precise on the two sucking suction grippers 49*b,c* and the contact plate 47. The sensor unit 53 likewise makes it possible to check whether the workpiece part 20 is in fact fixed on the counter-holding unit 34 situated in the fixing state.

Figure 4B:
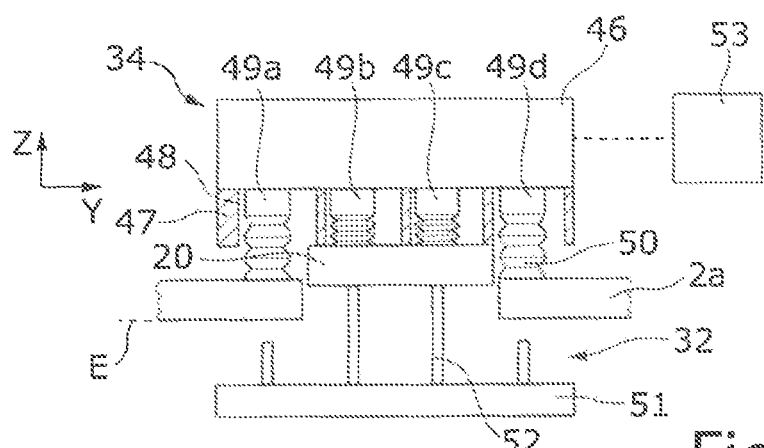
Figure 4C:
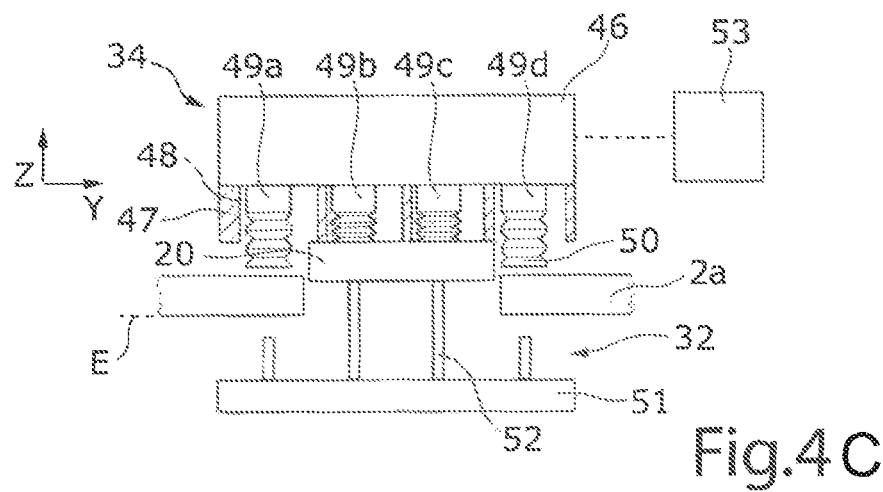
Figure 4D:
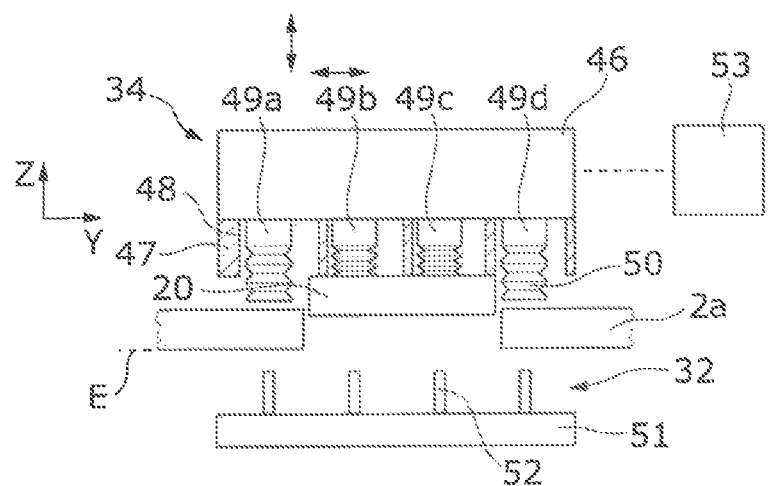
Figure 4E:
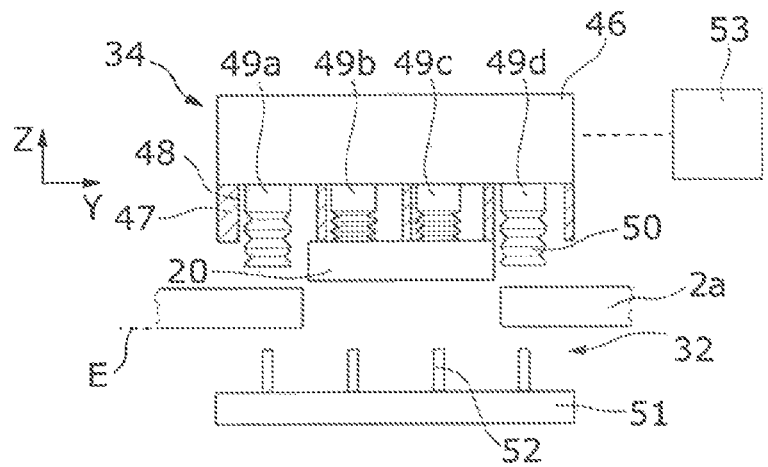

Once the workpiece part 20 is fixed on the counter-holding unit 34, the ejector pins 52 which have previously acted on the workpiece part 20 are retracted into the ejection housing 51 of the ejection unit 32, and the ejection unit 32 is lowered by a corresponding lowering movement of the ejection-movement unit 36, as illustrated in FIG. 4E. The counter-holding unit 34 then moves, with the workpiece part 20 fixed thereon, out of the vicinity of the workpiece support 27 by means of the counter-holding-movement unit 41. In order to release the workpiece part 20 from the holding unit 34 at a deposition location, the suction grippers 49*b,c* which hold the workpiece part 20 are depressurized.

In the example shown in FIG. 4B, the first removal attempt was not successful, however, i.e. the workpiece part 20 has jammed in the remainder 2*a* of the workpiece and is still connected to the latter, this being detected by means of the sensor unit 53. In order to remove the workpiece part 20 from the remainder 2a of the workpiece, the steps of a repeat strategy (retry strategy) which are described below are therefore carried out. During this process, it is typically necessary to check after each individual method step whether there is still contact between the workpiece part 20 and the remainder 2a of the workpiece or whether the workpiece part 20 is actually fixed on the two suction grippers 49a,b or not.

In a first step of the retry strategy, as evidenced by FIG. 4C, the two suction grippers 49a,d holding down the remainder 2a of the workpiece are released from the remainder 2a of the workpiece and moved upward, thus enabling the stress on the remainder 2a of the workpiece to dissipate. As an alternative or supplementary measure, the second counter-holding unit 35 acting as a hold-down device can be moved upward away from the remainder 2a of the workpiece, with the result that the clamping of the remainder 2a of the workpiece between the workpiece support 27 and the contact plate of the second counter-holding unit 35 is reduced or canceled. In another alternative, the force exerted on the scrap skeleton by the second counter-holding unit 35 can be reduced in steps or continuously, e.g. by pressure control by means of a proportional valve, if the traversing movement of the second counter-holding unit 35 in the Z direction is pneumatically controlled. The sensor unit 53 is then used to check whether the workpiece part 20 has been released from the remainder 2a of the workpiece.

If the workpiece part 20 has not been released from the remainder 2a of the workpiece, the two suction grippers 49a,d holding it down and/or the counter-holding unit 35 are positioned on the remainder 2a of the workpiece again, or the contact pressure is increased again in order to build up the load again. Sensor testing by means of the sensor unit 53 is then performed again to determine whether the workpiece part 20 has been released from the remainder 2a of the workpiece.

If the workpiece part 20 has not been released from the remainder 2a of the workpiece, the suction grippers 49a,d holding it down and/or the counter-holding unit 35 are released again from the remainder 2a of the workpiece, and the suction function of counter-holding unit 34 is then activated in order to transfer it from the release state to the fixing state. As illustrated in FIG. 4D, the ejector pins 52 are lowered in order to fully release the clamping of the workpiece part 20. Alternatively, the contact pressure of the pneumatically actuated ejector pins 52 can be reduced. Another check is then made to determine whether the workpiece part 20 has been released from the remainder 2a of the workpiece by this procedure.

If the workpiece part 20 has not been released from the remainder 2a of the workpiece, but is still in contact with the suction grippers 49b,c, the ejector pins 52 are once again clamped against the workpiece part 20, and the two further suction grippers 49a,d acting as hold-down devices, or the contact plate of the second counter-holding unit 35, are clamped against the remainder 2a of the workpiece, and the clamping is then reduced or released again. A check is once again made to determine whether the workpiece part 20 has been released from the scrap skeleton 2a by this buildup and reduction in the load.

If this was not successful, then, in the case of a thin, flexible workpiece part 20 (<3 mm material thickness) that it has not be possible to release from the remainder of the workpiece but is held by the vacuum on the suction grippers 49b,c, the workpiece part 20 is moved relative to the remainder 2a of the workpiece by small horizontal movements of the counter-holding unit 34 in order to eliminate distortions or snags, as indicated by a horizontal double arrow in FIG. 4D. During this backward and forward movement, the ejector pins 52 must have no contact with the underside of the workpiece.

If it has not been possible to release the thin, flexible workplace part 20 from the remainder 2a of the workpiece by means of the backward and forward movement, and it is still in contact with the suction grippers 49b,c, oscillating movements of the suction grippers 49a,b or of the counter-holding unit 34 along the removal direction Z are superimposed on the horizontal movements of the workpiece part 20.

If all of the previous method steps were unsuccessful, the workpiece part 20 is once again positioned on the workpiece support 27 in the bearing plane E by lowering the counter-holding unit 20 and thus the suction grippers 49b,c, and the vacuum is switched off. The suction grippers 49a,d serving as hold-down devices, and the contact plate of the second counter-holding unit 35, and the ejector pins 52 are then once again preloaded against the remainder 2a of the workpiece or the workpiece part 20. The counter-holding unit 47 and the ejector pins 52 are moved together in the removal direction Z at a speed v2 that is reduced relative to the speed v1 during the first removal attempt. Before and optionally after the vacuum is switched on, the sensor unit 53 is used to check again whether it has been possible to release the workpiece part 20 from the scrap skeleton 2a.

If this removal attempt is likewise unsuccessful, the workpiece part 20 is lowered again, and removal components 47, 49a-d, 52 are released from the workpiece part 20 and from the remainder 2a of the workpiece, or the contact pressure is reduced, in order to reduce or completely cancel the clamping. The load or clamping is then built up again, and the clamped workpiece part 20, the counter-holding unit 34 and the ejector pins 52 are moved jerkily upward at an increased speed v2 relative to the first removal attempt.

If the last method step of the retry method described above is also unsuccessful, machining is stopped and a fault message is output. Individual or all method steps can furthermore be repeated several times until a respectively predefined number of repetitions is reached.

Both in the case where the removal result is positive, i.e. a respective removal attempt was successful, and where this is not the case, the operating parameters of the at least one ejector element 18, 52 and/or of the at least one counter-holding element 14a,b, 49b,c, 47 which have been used in the respective removal attempt can be stored in a result memory 54 in the form of an operating parameter set together with geometric parameters (geometry of the edge contour, length, width, thickness etc.) of the workpiece part 20 to be removed (cf. FIG. 1). In the example shown, the result memory 54 is cloud-based but can also be provided on a central computer/server at the factory in which the machine 1 is located or in the machine 1, e.g. in the control unit 16.

For the definition of a suitable retry strategy, the control unit 16 can read out the result memory 54 in order to define an optimized sequence of removal attempts, each with suitable operating parameters or a respectively associated operating parameter set, on the basis of the geometric parameters of the workpiece part 20 to be removed. In the case where removal attempts with a negative outcome or removal results are also stored in the result memory 54, the probability of success of removal can be determined from the geometric parameters of a respective workpiece part 20 to be removed and, if required, a warning can be output to an operator or programmer during the creation of a control program for the laser cutting machine 1 if successful removal of the corresponding workpiece part 20 is not to be expected.

The invention claimed is:

1. A method for removing a workpiece part from a remainder of a workpiece supported in a bearing plane, which comprises the steps of:
    moving the workpiece part, being clamped between at least one ejector element of an ejection unit and at least one counter-holding element of a counter-holding unit, along a removal direction;
    checking whether the workpiece part has been completely separated from the remainder of the workpiece during movement along the removal direction; and
    reducing or completely canceling a clamping of the workpiece part and subsequently resuming the clamping of the workpiece part if it is determined during the checking that the workpiece part has not been completely separated from the remainder of the workpiece.

2. The method according to claim 1, wherein the step of reducing or completely canceling the clamping of the workpiece part and of resuming the clamping of the workpiece part is carried out multiple times.

3. The method according to claim 1, wherein when canceling the clamping, contact between the ejector element and the workpiece part is first of all canceled.

4. The method according to claim 1, which further comprises clamping the remainder of the workpiece between a workpiece support for supporting the remainder of the workpiece in the bearing plane and at least one further counter-holding element during the movement of the workpiece part along the removal direction, wherein the clamping of the remainder of the workpiece is reduced or completely canceled before a reduction or complete cancellation of the clamping of the workpiece part.

5. The method according to claim 1, wherein during a reduction or release of the clamping, the workpiece part is fixed on the at least one counter-holding element of the counter-holding unit situated in a fixing state.

6. The method according to claim 1, wherein when the clamping of the workpiece part has been canceled, moving the counter-holding unit in at least one direction perpendicular to the removal direction relative to the remainder of the workpiece.

7. The method according to claim 6, wherein the counter-holding unit is additionally moved along the removal direction relative to the remainder of the workpiece.

8. The method according to claim 1, wherein the workpiece part is clamped by means of a plurality of counter-holding elements of the counter-holding unit, which are moved in opposite senses along the removal direction in order to separate the workpiece part from the remainder of the workpiece.

9. The method according to claim 1, wherein at least one supporting surface of the at least one counter-holding element, the at least one supporting surface supporting the workpiece part, is lowered below the bearing plane of the remainder of the workpiece as the workpiece part is moved along the removal direction, and the ejector element presses against the workpiece part from above during a lowering process.

10. The method according to claim 1, which further comprises:
    moving the workpiece part along the removal direction with reduced or completely canceled clamping into the bearing plane of the remainder of the workpiece;
    resuming the clamping of the workpiece part between the at least one ejector element of the ejection unit and the at least one counter-holding element of the counter-holding unit; and
    renewed moving of the workpiece part along the removal direction, at a speed which differs from a speed during the moving of the workpiece part along the removal direction.

11. The method according to claim 1, which further comprises:
    storing geometric parameters of the workpiece part to be removed, of a removal result and of operating parameter sets of the at least one ejector element and/or of the at least one counter-holding element during a reduction or complete cancellation and subsequent resumption of the clamping of the workpiece part and of the remainder of the workpiece and/or during a renewed moving of the workpiece part along the removal direction in a result memory.

12. The method according to claim 11, which further comprises automatically generating a removal forecast for the workpiece part to be removed on a basis of geometric parameters of the workpiece part to be removed and of the geometric parameters, stored in the result memory, of removed workpiece parts and a respectively associated removal result.

13. The method according to claim 11, which further comprises automatically selecting the operating parameter sets, stored in the result memory, in dependence on the geometric parameters of the workpiece part to be removed.

* * * * *